3,761,443
DIELS-ALDER ADDUCT FLAME RETARDANTS
FOR POLYMERS
Jack Newcombe, Freehold, N.J., assignor to Cities
Service Company, New York, N.Y.
No Drawing. Continuation-in-part of abandoned application Ser. No. 115,081, Feb. 12, 1971. This application Aug. 18, 1972, Ser. No. 281,691
Int. Cl. C08f 45/58
U.S. Cl. 260—45.75 B                          10 Claims

ABSTRACT OF THE DISCLOSURE

A normally flammable organic polymer is rendered flame retardant by the incorporation of a compound corresponding to the formula:

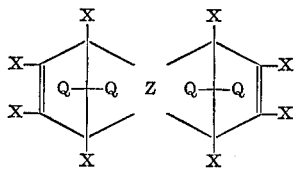

wherein X is chloro or bromo, Q is halo, hydrogen, or a hydrocarbyl or hydrocarbyloxy group, and Z is a tetravalent saturated cyclic polybromohydrocarbon group containing 7–20 carbon atoms and 2–6 bromine atoms which are paired in vicinal positions. Such flame retardants include, e.g., the dibrominated 2:1 Diels-Alder adduct of hexachlorocyclopentadiene and cyclododecatriene-1, 5, 9. If desired, the flame retardant may be employed in conjunction with a synergist, such as antimony trioxide.

CROSS-REFERENCE TO RELATED APPLICATION

This application is a continuation-in-part of copending application Ser. No. 115,081, filed Feb. 12, 1971, now abandoned.

BACKGROUND OF THE INVENTION

Field of the invention

This invention relates to flame-retardant compositions and more particularly relates to such compositions comprising normally flammable organic polymers and novel halogenated organic flame retardants.

Description of the prior art

It is known that halogenated compounds are sometimes useful for imparting flame retardancy to normally flammable organic polymers. However, the halogenated compounds which have been proposed for use as flame retardants usually have one or more of the following disadvantages: volatility; instability at processing temperatures, incompatibility, inefficiency, and toxicity.

If the halogenated compound is too volatile, it does not remain in the polymer to function as a flame retardant when needed. If it is unstable at processing temperatures, it decomposes to cause corrosion of the equipment and discoloration of the polymer. If it is incompatible with the polymer, it exudes to the surface to form an aesthetically unpleasing deposit, the removal of which results in removing the flame retardancy which the compound was supposed to impart. If it is inefficient, it must be used in such high concentrations that it has an unduly deleterious effect on polymer properties and unduly increases the cost of the fabricated polymer. If it is toxic, it presents more-or-less serious hazards to the health and/or life of fabricators and users of the flame-retardant composition in which it is used and also presents an ecological problem when the fabricated polymer is discarded.

Since some of these disadvantages make a compound less than desirable for use as a flame retardant, and others actually prevent it from having any practical utility as a flame retardant, it is apparent that there is a need for a flame retardant which is substantially non-volatile, stable at processing temperatures, compatible, efficient, and non-toxic.

It is believed that the general lack of success of the prior art in producing such a flame retardant is at least partially due to the tendency of a given factor to degrade at least one of these properties while improving another. For instance, it has been found that compounds containing cycloaliphatic bromine are sometimes more efficient than other halogenated compounds, but these compounds have poor stability at processing temperatures and frequently have other disadvantages, such as volatility, incompatibility, and toxicity. Compounds containing vinylic bromine on the ring carbon atoms are more stable but less efficient, and they may also be too volatile, toxic, and incompatible.

It might be thought that the toxicity of halogenated compounds could be reduced by decreasing their halogen contents, but this has not been found to be the case. Comparison of halogenated insecticides having similar structures indicates that toxicity does not simply increase with an increase in halogen content and, in fact, may even decrease with an increase in halogen content. For instance, the hexachlorocyclopentadiene adduct aldrin, with six chlorine atoms, has a halogen content of about 58% and an $LD_{50}$ number of 55; the hexachlorocyclopentadiene adduct heptachlor, with seven chlorine atoms, has a halogen content of about 66% and an $LD_{50}$ number of 130–135; the hexachlorocyclopentadiene adduct chlordane, with eight chlorine atoms, has a halogen content of about 69% and an $LD_{50}$ number of 570.

SUMMARY OF THE INVENTION

An object of this invention is to provide novel flame-retardant organic polymer compositions.

Another object is to provide such compositions containing a flame retardant which has practical utility.

A further object is to provide such compositions wherein the flame retardant is substantially non-volatile, stable at processing temperatures, compatible, efficient, and non-toxic.

These and other objects are attained by intimately mixing a normally flammable organic polymer with a flame retardant corresponding to the formula:

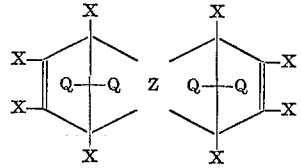

wherein X is chloro or bromo, Q is halo, hydrogen, or a hydrocarbyl or hydrocarbyloxy group, and Z is a tetravalent saturated cyclic polybromohydrocarbon group containing 7–20 carbon atoms and 2–6 bromine atoms which are paired in vicinal positions.

DESCRIPTION OF THE PREFERRED EMBODIMENTS

The normally flammable organic polymer which is rendered flame retardant in accordance with the invention may be natural or synthetic but is preferably a solid synthetic polymer, more preferably a polymer of an unsaturated hydrocarbon. Exemplary of the polymers are cotton, wool, silk, paper, natural rubber, wood, paint, the high molecular weight homopolymers and copolymers of unsaturated aliphatic and aromatic hydrocarbons (e.g., ethylene, propylene, styrene, etc.), acrylic polymers (e.g., polyacrylonitrile, polymethyl methacrylate, etc.), alkyd resins, cellulose derivatives (e.g., cellulose acetate, methyl cellulose, etc.), epoxy resins, furan resins, isocyanate resins (e.g., polyurethanes), melamine resins, vinyl resins (e.g., polyvinyl acetate, polyvinyl chloride, etc.), resorcinol resins, synthetic rubbers (e.g., polyisoprene, polybutadiene, butadiene-acrylonitrile copolymers, butadiene-styrene copolymers, butyl rubber, neoprene rubber, etc.), ABS resins, and mixtures thereof.

The flame retardant of the invention may be any compound corresponding to the above formula. Such compounds may be prepared by reacting a polyhalocyclopentadiene with a suitable multi-unsaturated cycloaliphatic hydrocarbon containing at least three double bonds to form a 2:1 Diels-Alder adduct, and then adding bromine to the residual unsaturation. It is important that all the residual unsaturation be removed by the bromination, because the presence of residual unsaturation would decrease the efficiency of the compound as a flame retardant.

Polyhalocyclopentadienes suitable for use in preparing the flame retardants of the invention include hexachlorocyclopentadiene,
hexabromocyclopentadiene,
5,5-dimethoxytetrachlorocyclopentadiene,
5,5-diethoxytetrachlorocyclopentadiene,
5,5-dihydrotetrachlorocyclopentadiene,
5,5-difluorotetrachlorocyclopentadiene,
5,5-dibromotetrachlorocyclopentadiene, etc.

The polyhalocyclopentadienes containing at least two chlorine atoms are preferred, because the flame retardants prepared therefrom appear to have improved dispersibility in many organic polymers.

Multi-unsaturated cycloaliphatic hydrocarbons suitable for use in preparing the flame retardants of the invention include trivinylcyclohexane, cycloheptatriene-1,3,6, cyclododecatriene-1,5,9, trimethylcyclododecatriene-1,5,9, bis(cyclohexenyl)ethylene, cyclooctatetraene, cyclohexadecatetraene-1,5,9, etc.

The preferred flame retardants of the invention are those wherein X and Q of the formula are chloro, the polybromohydrocarbon groups contains 2-4 (most preferably two) bromine atoms, at least two (most preferably all) of the bromine atoms of the polybromohydrocarbon group are substituents on cycloaliphatic carbon atoms, and/or the polybromohydrocarbon group is monocyclic and contains 8-16 carbon atoms in the ring. A particularly preferred flame retardant is the dibrominated 2:1 Diels-Alder adduct of hexachlorocyclopentadiene and cyclododecatriene-1,5,9, which may be represented by the formula:

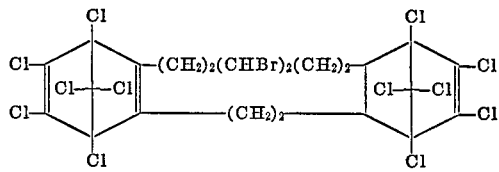

The organic polymer is intimately mixed with the flame retardant and any optional additives, such as fillers, pigments, plasticizers, stabilizers, synergists, etc., in any suitable manner (e.g., by the use of an extruder, a two-roll mill, or a Banbury mixer) to provide a composition containing about 1–25%, preferably about 4–20%, by weight of flame retardant, based on the combined weights of organic polymer and flame retardant.

Although the flame retardants of the invention are fairly efficient, it is frequently desirable to enhance their effectiveness by including one or more of the compounds of antimony, arsenic, or bismuth, which are well known synergists for halogenated flame retardants. Antimony trioxide is particularly useful in this regard. When such a synergist is employed, it is usually used in an amount such as to provide a flame retardant/synergist weight ratio of about 1–5/1, preferably about 2/1.

The flame retardants of the invention are particularly advantageous in that they are colorless, odorless, relatively insensitive to environmental conditions, non-toxic, substantially non-volatile, compatible with polymers, surprisingly stable at processing temperatures, and efficient. The fact that they are effective at low concentrations makes it possible for them to be used to prepare flame-retardant polymer compositions which retain the desirable physical properties of the pure polymer to a remarkable extent, and it facilitates polymer coloring and permits the preparation of flame retardant concentrates.

The following example is given to illustrate the invention and is not intended as a limitation thereof. Unless otherwise specified, quantities mentioned are quantities by weight. The polypropylene used in the example has an oxygen index of 18.0.

EXAMPLE

Form a composition having a bromine content of 3% by blending polypropylene with a 1:2 mixture of antimony trioxide and a flame retardant corresponding to the formula:

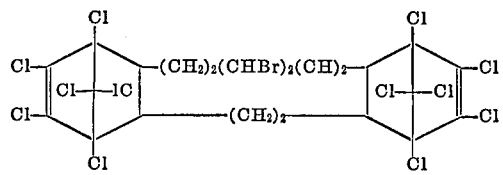

Test specimens of the composition have an oxygen index of 26.8.

The oxygen index is also elevated when the polymer is polyethylene, ABS, or impact polystyrene and when the flame retardant is one of the other flame retardants taught in the specification.

It is obvious that many variations may be made in the products and processes set forth above without departing from the spirit and scope of this invention.

What is claimed is:

1. A composition comprising a normally flammable organic polymer and a flame retardant corresponding to the formula:

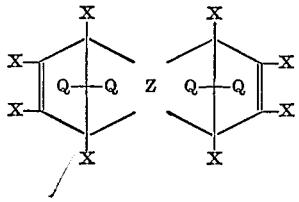

wherein X is chloro or bromo, Q is halo, hydrogen, or a hydrocarbyl or hydrocarbyloxy group, and Z is a tetravalent saturated cyclic polybromohydrocarbon group containing 7–20 carbon atoms and 2–6 bromine atoms which are paired in vicinal positions.

2. The composition of claim 1 wherein Z contains 2–4 bromine atoms.

3. The composition of claim 2 wherein Z contains two bromine atoms.

4. The composition of claim 1 wherein at least two of the bromine atoms of Z are substituents on cycloaliphatic carbon atoms.

5. The composition of claim 4 wherein all of the bromine atoms of Z are substituents on cycloaliphatic carbon atoms.

6. The composition of claim 1 wherein X and Q are chloro.

7. The composition of claim 6 wherein Z is a saturated monocyclic polybromohydrocarbon group containing 8–16 carbon atoms in the ring and 2–4 bromine atoms.

8. The composition of claim 7 wherein the flame retardant corresponds to the formula

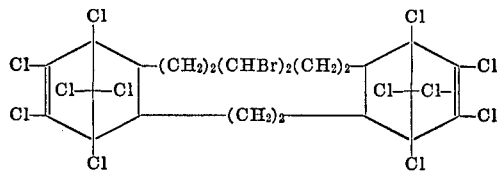

9. The composition of claim 1 wherein the normally flammable organic polymer is a synthetic polymer of an unsaturated hydrocarbon.

10. The composition of claim 1 containing a synergist selected from compounds of antimony, arsenic, and bismuth.

References Cited
UNITED STATES PATENTS

| | | | |
|---|---|---|---|
| 3,222,249 | 12/1965 | Koremura et al. | 260—648 |
| 3,356,688 | 12/1967 | Mark | 260—648 |
| 3,403,036 | 9/1968 | Hindersinn et al. | 260—45.75 |

DONALD E. CZAJA, Primary Examiner

V. P. HOKE, Assistant Examiner

U.S. Cl. X.R.

106—15 FP; 260—2.5 AJ, 45.7 R

UNITED STATES PATENT OFFICE
CERTIFICATE OF CORRECTION

Patent No. 3761443   Dated September 25, 1973

Inventor(s) Jack Newcombe

It is certified that error appears in the above-identified patent and that said Letters Patent are hereby corrected as shown below:

Column 3, line 40, "tetraene - 1, 5, 9" should read -- tetraene - 1, 5, 9, 13 -- ;
lines 53 - 60, the portion of the formula reading " 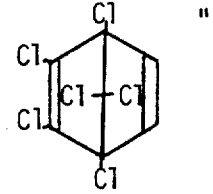 "

should read -- 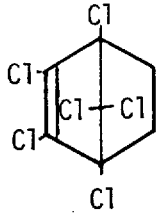 -- .

Column 4, lines 25 - 33, the portion of the formula reading " 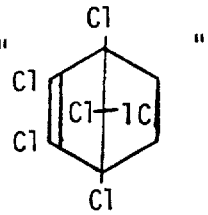 "

should read -- 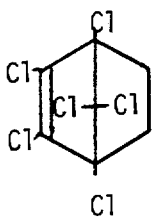

Signed and sealed this 25th day of December 1973.

(SEAL)
Attest:

EDWARD M. FLETCHER, JR.
Attesting Officer

RENE D. TEGTMEYER
Acting Commissioner of Patents